June 3, 1930. W. C. HAUSER 1,761,339
CLOSURE PLUG
Filed May 29, 1929
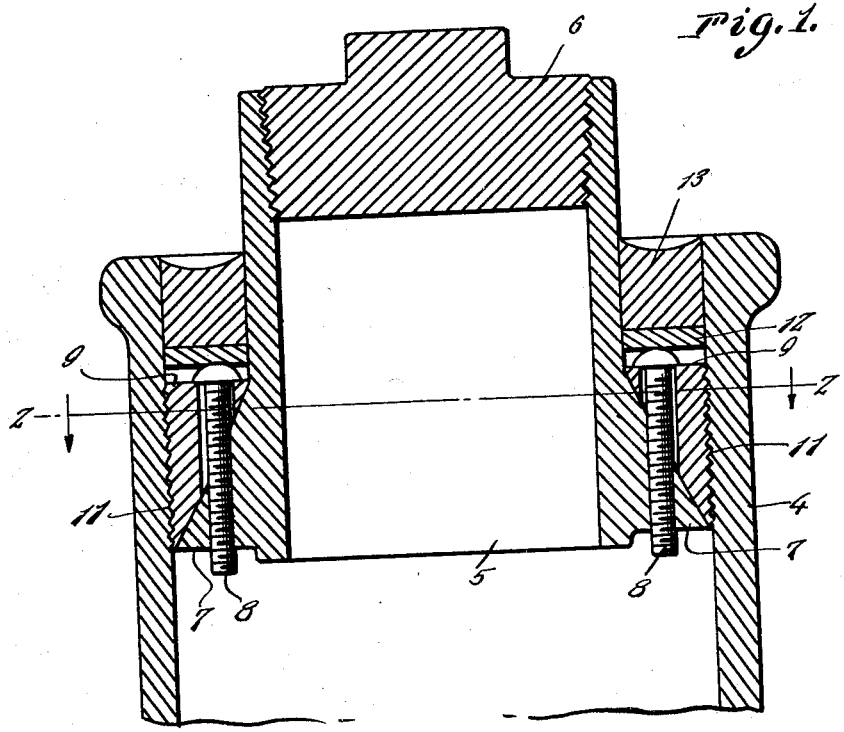
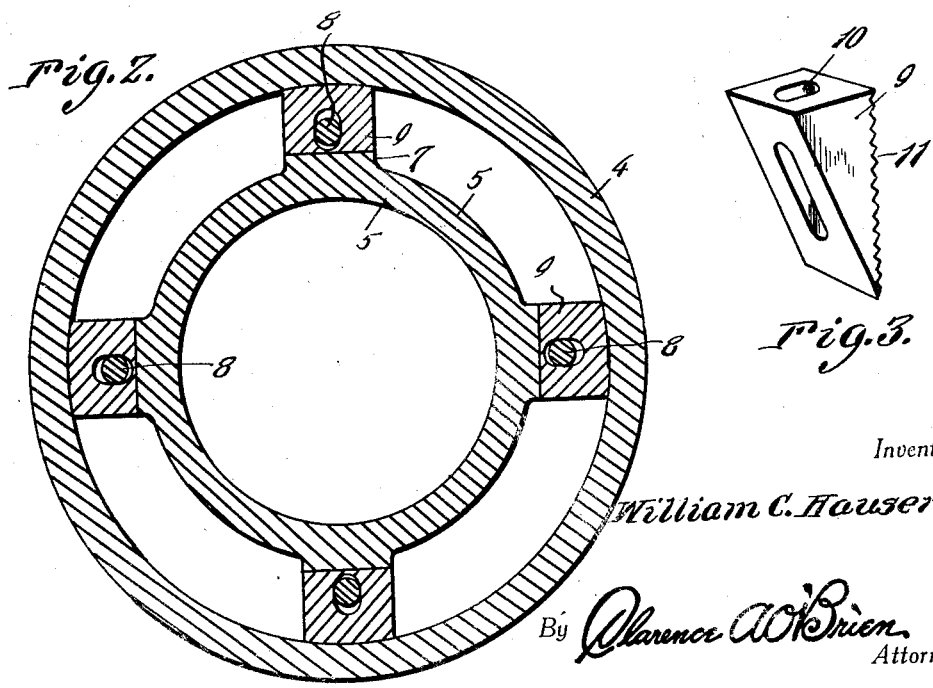
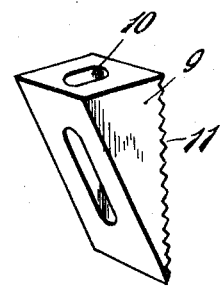
Inventor
*William C. Hauser*,
By *Clarence A. O'Brien*
Attorney

UNITED STATES PATENT OFFICE

WILLIAM C. HAUSER, OF FOREST PARK, ILLINOIS

CLOSURE PLUG

Application filed May 29, 1929. Serial No. 367,053.

This invention relates to an improved closing plug adapted to be inserted in the end of a pipe having neither internal nor external screw threads for accommodating the customary form of plug.

Difficulty is ordinarily experienced in closing the end of the threadless pipe in water, gas pipes and the like. I have therefore evolved and produced simple and inexpensive closure which may be inserted and securely held in place by unskilled hands.

In accordance with the invention I provide a sleeve which is intended to be fitted within the pipe-end and which is provided with wedge expanded anchoring slips, and further provided with a removable screw cap.

In carrying the invention into effect I have evolved and produced a simple and inexpensive pipe closing plug which may be readily placed in position and held in place in a dependable and secure manner, and which is susceptible of accommodating a lead calking joint to provide a fluid tight closure.

The particular details and their relative association and arrangement will become more readily apparent from the following description and drawings.

In the drawings:

Figure 1 is an enlarged sectional view through a pipe equipped with a closing plug constructed in accordance with the present invention.

Figure 2 is a cross section on the line 2—2 of Figure 1.

Figure 3 is a perspective view of one of the wedge shaped tooth equipped slips.

In the drawings the reference character 4 designates the threadless pipe, and 5 represents the sleeve which as before intimated is internally screw threaded at its outer end to accommodate a removable closing cap or plug 6. On its inner end this sleeve is provided with circumferentially spaced expanding wedges, projections 7, these having screw threaded openings to accommodate an expanding and retaining screw 8. Cooperable with each depending wedge is an anchoring slip in the form of a wedge shaped block 9 as seen in Figure 3. This is provided with a passage 10 for the aforesaid bolt 8. The reference character 11 designates the anchoring teeth which are forced into the wall of the pipe as shown in Figure 1.

In practice the sleeve is inserted and the bolts are tightened to produce a cam action between the slip and wedge expanders, thus forcing the slip into firm anchoring engagement with the pipe as is obvious from Figure 1. This thereby anchors the sleeve and plug 6 in place. A channel exists between the pipe and sleeve and this is intended to be filled by a washer 12 and a lead calk or packing 13, thus forming a fluid tight joint.

It is thought that by considering the description in connection with the drawings, a clear understanding of the construction, assembly and features and advantages of the improved pipe closing device will be had, therefore a more lengthy description is believed to be unnecessary.

Minor changes in shape, size, and rearrangement of details coming within the field of invention claimed may be resorted to in actual practice if desired.

Having thus described the invention, what I claim as new and desire to secure by Letters Patent is:—

In a structure of the class described, in combination, a threadless pipe and a closure therefor comprising a sleeve extending into the pipe, said sleeve being of a diameter less than the pipe and provided with a removable screw cap and further provided on its inner end with external circumferentially spaced wedge shaped extensions, each extension being formed with a screw threaded bolt hole, a toothed wedge shaped anchoring slip cooperable with each extension and having a hole to accommodate the bolt and provided with anchoring teeth, and a bolt cooperable with each slip and its complemental extension, together with calking means interposed between the pipe and sleeve.

In testimony whereof I affix my signature.

WILLIAM C. HAUSER.